Feb. 8, 1938. G. G. GILPIN 2,107,862
BUNKER FOR RAILWAY REFRIGERATOR CARS
Original Filed Feb. 5, 1934 8 Sheets-Sheet 2

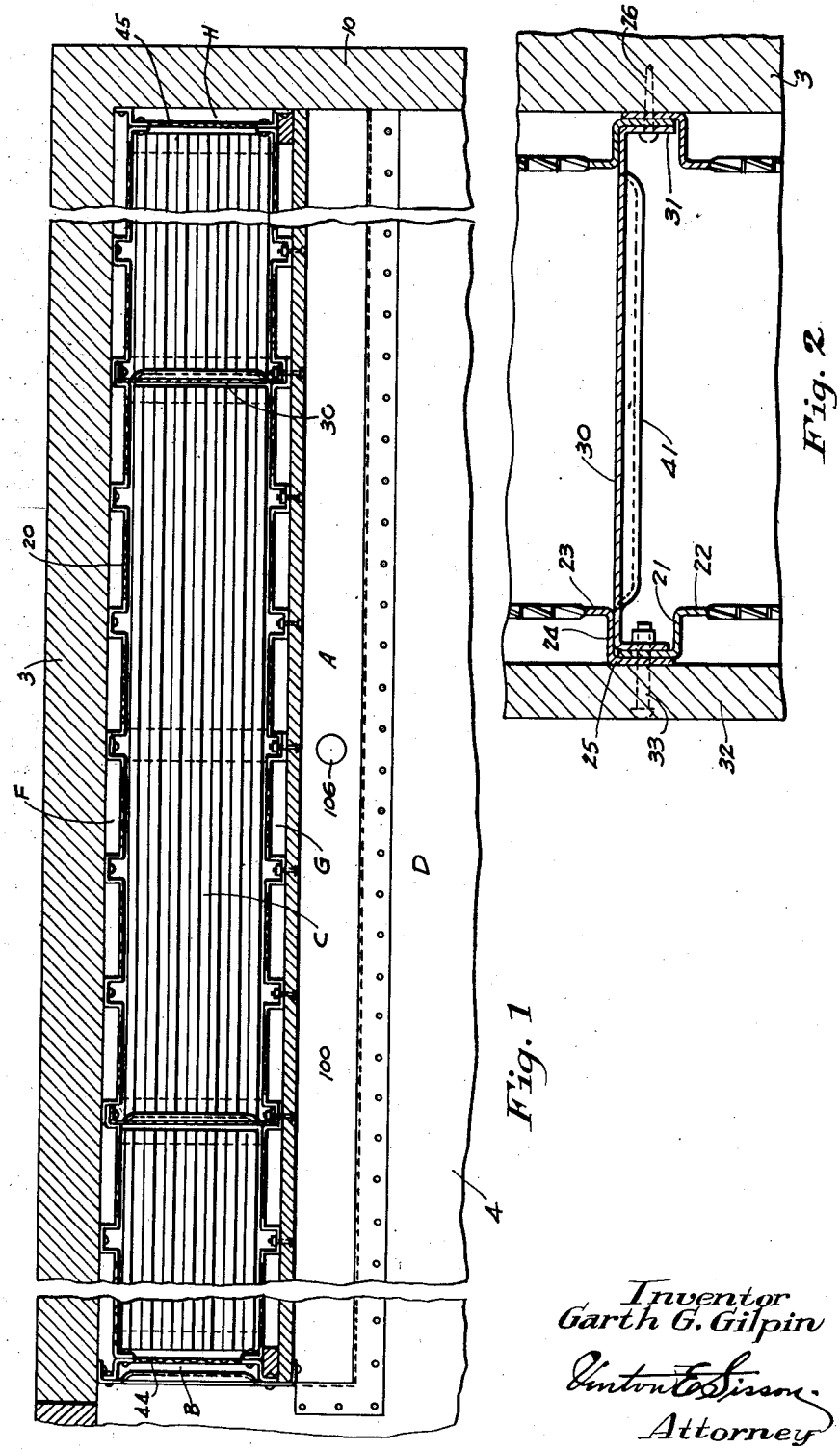

Inventor
Garth G. Gilpin
Attorney

Feb. 8, 1938.   G. G. GILPIN   2,107,862
BUNKER FOR RAILWAY REFRIGERATOR CARS
Original Filed Feb. 5, 1934    8 Sheets-Sheet 3

Inventor
Garth G. Gilpin
Attorney

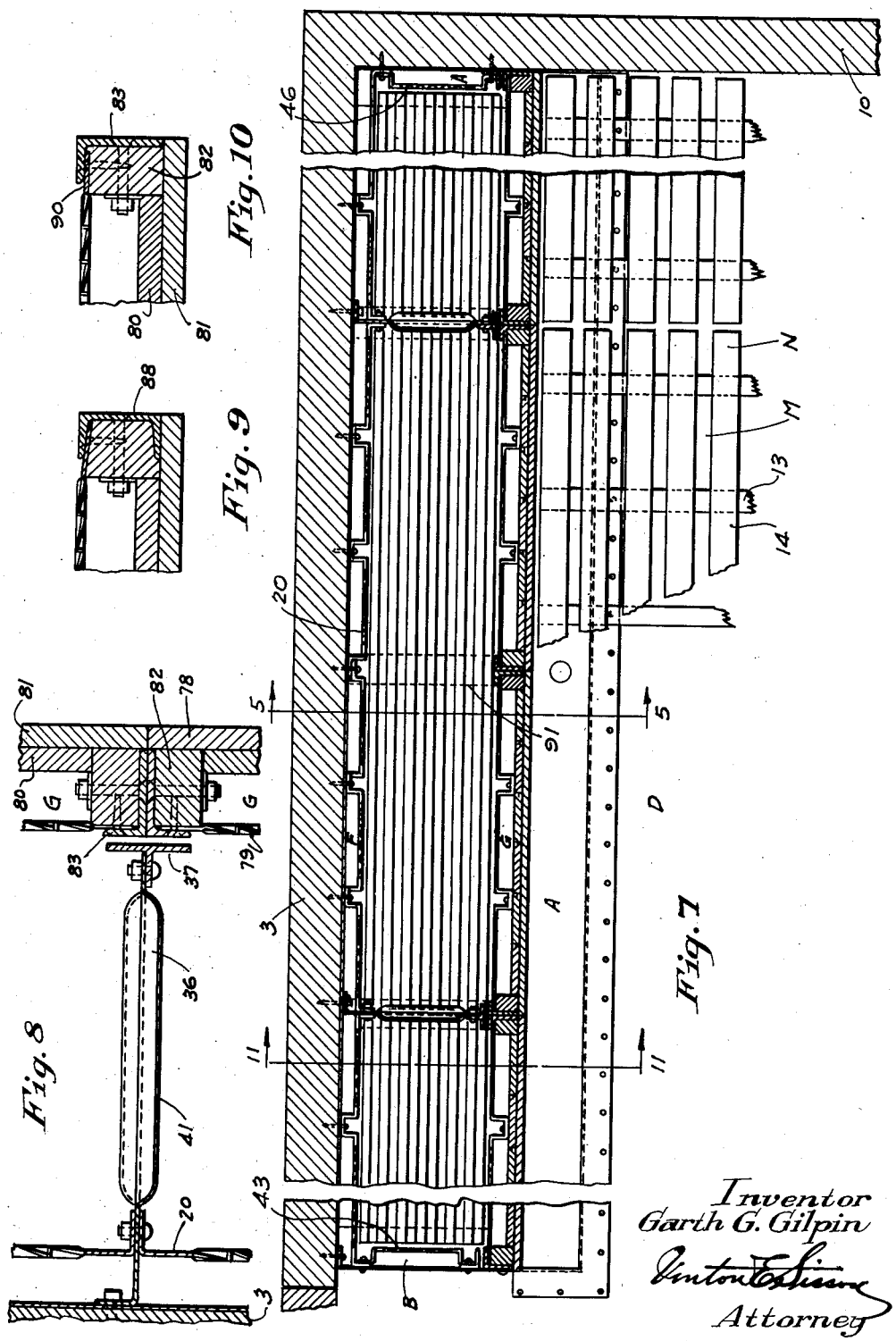

Inventor
Garth G. Gilpin
Attorney

Feb. 8, 1938. G. G. GILPIN 2,107,862
BUNKER FOR RAILWAY REFRIGERATOR CARS
Original Filed Feb. 5, 1934 8 Sheets-Sheet 7

Inventor
Garth G. Gilpin
Attorney

Feb. 8, 1938. G. G. GILPIN 2,107,862
BUNKER FOR RAILWAY REFRIGERATOR CARS
Original Filed Feb. 5, 1934 8 Sheets-Sheet 8

Inventor
Garth G. Gilpin
Linton E. Sisson
Attorney

Patented Feb. 8, 1938

2,107,862

UNITED STATES PATENT OFFICE

2,107,862

BUNKER FOR RAILWAY REFRIGERATOR CARS

Garth G. Gilpin, Riverside, Ill., assignor to Standard Railway Equipment Company, Chicago, Ill., a corporation of Delaware Application February 5, 1934, Serial No. 709,778
Renewed August 3, 1937

13 Claims. (Cl. 62—19)

The invention relates to insulated railway cars, sometimes called refrigerator cars, which are equipped with bunkers or air circulating chambers adapted for the reception of a heating or cooling medium and wherein the car is constructed so that the cooled or heated air is caused to circulate around or through the lading and to return to the bunker. Such bunker equipped cars are also used for ventilating the lading by opening hatchways in the roof of the car over the bunker or air circulating chambers.

Bunkers or air circulating chambers are sometimes placed near the end walls of the car so that the path of the circulating air extends longitudinally of the car but preferably the bunkers or air circulating chambers extend longitudinally of the car adjacent to and parallel to one of the side walls of the car and preferably such side bunkers extend from one of the end walls of the car to adjacent a side door which doors are usually at the middle of a side wall of the car, and my invention relates to improvements in the component parts of side bunkers for insulated railway cars as well as improvements in the construction of bunkers in general. Owing to their length the side bunkers can be made very narrow and still have the same ice capacity as end bunkers for the same car.

An object is to provide a bulkhead for a narrow bunker or air circulating chamber comprising a plurality of sections independently hinged to the car, preferably adjacent the ceiling of the car, so as to swing away from the chamber to provide access thereto for inspection, repairing, cleaning, etc. Such air circulating chambers in side bunker cars are generally about 13" or 14" wide, which is too narrow for a man to move about in, therefore, the usual entrance into such chamber in the end of the car, that is, through the hatchways in the roof, is not practicable. The bulkhead sections are preferably hinged to the car adjacent the ceiling but the bulkhead may comprise a plurality of vertically and/or horizontally disposed sections, or a part of the bulkhead may be of rigid construction and the remainder of hinged sections.

Another object is to provide such hinged sections with frame members or stiffeners adjacent their vertical margins and attaching the stiffeners of adjacent sections together to provide cooperation between them to form beams and posts and furthermore to support such beams adjacent the floor of the car.

Another object of the invention is to provide a hinged bulkhead forming a cooling chamber separate from the lading compartment of the car which is removably secured to an ice supporting means in the cooling chamber and to associate and arrange the bulkhead and ice supporting means so that they retain each other in their normal positions. Another object is to provide pockets or recesses in the floor of the cooling chamber which are engaged by portions of the ice supporting means so as to be removed therefrom only by an upward movement thereof and to secure the swingable bulkhead to the ice supporting means so as to prevent such upward movement and also to prevent the bulkhead from swinging and so that upon removal of the attaching means the bulkhead may swing and the ice supporting means may be raised (and removed).

Another object is to provide baffles or partitions in a bunker extending laterally of the car within the cooling chamber to prevent ice, brine tanks or other cooling or heating mediums from sliding longitudinally of the car against the end wall of the car and against each other, which baffles or partitions also brace the bulkhead and also may form abutments for swingable bulkhead sections when swingable sections are used. Another object is to provide a light, rigid partition by making it of a metallic plate formed with integral horizontal corrugations forming beams between the wall of the car and the bulkhead.

Another object is to provide an air circulating chamber with a diagonally disposed floor sloping downwardly toward the lading compartment and also preferably providing a drip pan in the lading compartment adjacent the bulkhead and parallel thereto, which pan may be provided with drain traps so that downwardly moving air will be deflected toward the lading chamber and melted ice and debris will drain toward and into the drip pan and the drip pan may be cleaned and the drain traps operated (opened) without entering the air circulating chamber. This is desirable in side bunkers which are necessarily very narrow as heretofore explained. The melted ice water in the drip pan functions better to cool the lading and the lading compartment than it would if it were allowed to remain on a horizontal floor below the cooling chamber. Such a bunker can be easily cleaned with a stream of water from a hose as the sloping floor directs the loose ice, sawdust, debris, etc., into the drip pan where it is easily removable. Another object is to protect the drip pan from the lading by extending the false floor over it and furthermore to form the false floor to act as a baffle to prevent water in the drip pan from splashing, due to the movements of the car.

Another object is to provide a sloping ceiling in a refrigerator car which is lowest adjacent the side wall of the car opposite the bulkhead of the side bunker and highest adjacent the bulkhead. Warm air rising in the lading compartment is drawn to the upper part of the bunker to fill the rare air pocket caused at this place by the descending cooled air in the bunker. The sloping ceiling accelerates this movement of air toward the bunker as the warmed air tends to go to the highest place in the ceiling which, as stated, is adjacent the bulkhead. This sloping ceiling also reduces the warm air pocket near the opposite side wall.

Another object of the invention is to provide a foraminous wall for an air circulating chamber for a railway refrigerator car of expanded metal having non-expanded vertical portions of the metal bent to form angular or channel shaped stiffeners or posts which not only brace the foraminous wall against deflection, but which may be attached to the wall of the refrigerator car to maintain the foraminous (or expanded part) in spaced relation to the wall and to provide a flue for falling air when ice or brine tanks are used in the air circulating chamber. These stiffeners may be positioned at the margins and/or middles of the foraminous walls.

In the drawings:

Fig. 1 is a sectional plan view of my improved side bunker in a railway refrigerator car.

Fig. 2 is an enlarged view of one of the partitions and associated parts.

Fig. 7 is a plan sectional view of the modification shown in Fig. 5.

Fig. 8 shows one of the partitions of the modification of Figs. 5 and 7 and the associated parts.

Figs. 9 and 10 show the marginal part of the hinged sections.

Figure 3:
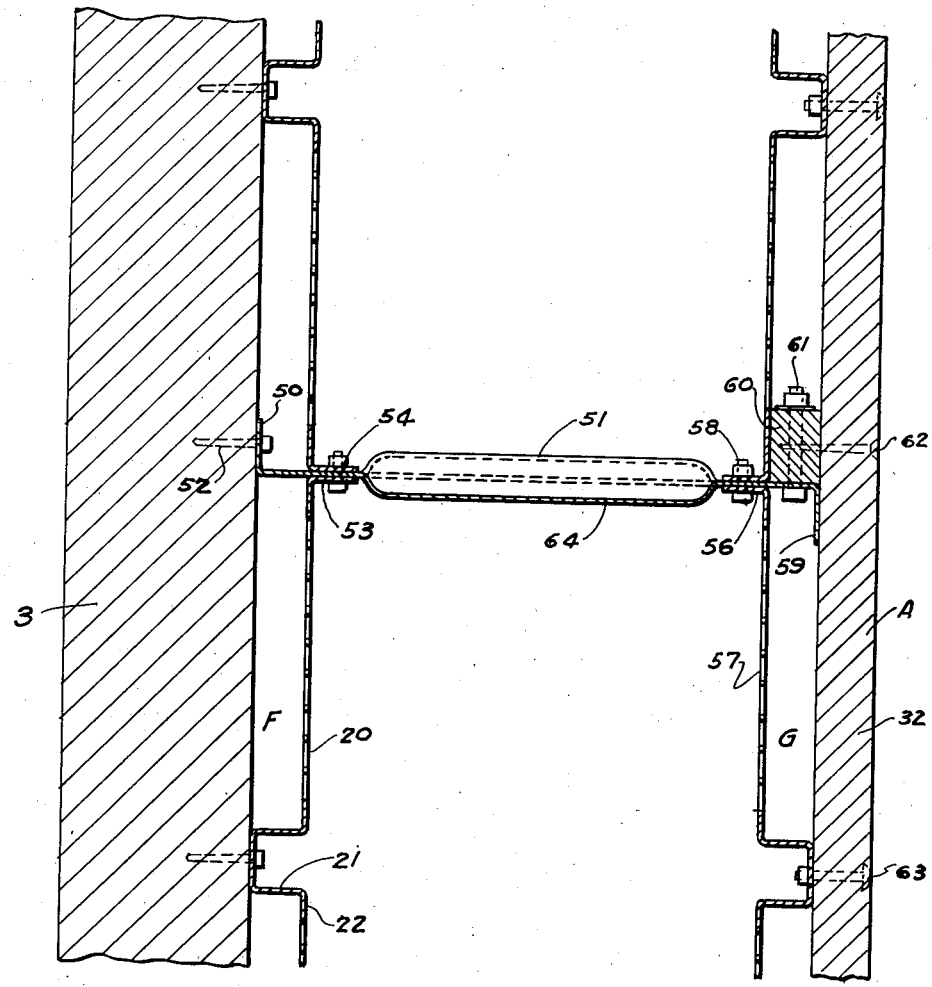
Fig. 3 is an enlarged view of a modified partition and associated parts.

In the drawings the usual parts of the car are shown, such as side sills 1; side plates 2; side wall 3; floor 4; ceiling 5; roof 5; hatchway 7; hatch-lid 8; hatch plug 9; end wall 10; end plate 11; end sill 12; floor stringers 13 and false floor slats 14.

In the form of my invention illustrated the side bunker comprises primarily a longitudinal bulkhead A and a short lateral bulkhead B separating the air circulating chamber or cooling chamber C from the lading compartment D of the car, grate bars E or other supporting means for ice or other temperature changing mediums, vertical flues F G H and J around the ice for the descension of cooled air and ascension of heated air, upper K and lower L openings in the bulkhead for the circulation of air to and from the air cooling chamber C, and laterally extending conduits M below a foraminous floor N for movement of air below the lading and up through or between the lading. The air circulating system involved is not a part of my invention.

When such a system is used to cause the air to circulate laterally of the car a more efficient heating, cooling or ventilating is obtained over a car wherein the air circulates longitudinally of the car because the path of circulation of the air is shorter, giving more frequent contacts of the air with the cooling or heating medium, the lading is nearer the air circulating chamber and furthermore a greater area of ice exposure is obtained for an equal amount of ice. In heating a higher temperature is obtained in the lading compartment and in cooling a lower temperature is obtained and in both heating and cooling a more even temperature is obtained. In ventilating not only is a greater volume of air obtainable through the greater number of hatchways, but the moving air is better distributed over the lading compartment.

Figure 4:
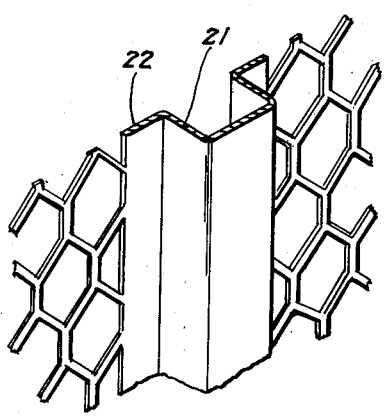
Fig. 4 is a fragmentary perspective view of a part of the expanded metal forming a foraminous wall.

The inner wall of the bunker comprises a foraminous wall 20 formed of a plurality of expanded metal sections, (see Fig. 4) each having one or more non-expanded vertical portions bent to form channel shaped stiffeners 21, which sections are preferably formed with a lateral flange 22 at each side of the channel also of non-expanded metal to give strength to the stiffener. The vertical marginal parts 23 of each section are preferably also formed of non-expanded metal and bent to form a flange 24 having a reflange 25. (See Fig. 2.) The channels 21 not only stiffen the foraminous wall 20 but also retain such wall in spaced relation to the side wall 3 of the car to provide flues F for the circulation of air and also provide means for attachment of the foraminous wall 20 to the side wall of the car by means of the lags 26 if desirable. This wall extends from the ceiling 6 of the car adjacent the hatchway 7 to the top of the grate bars E, as shown in Fig. 11.

Figure 11:
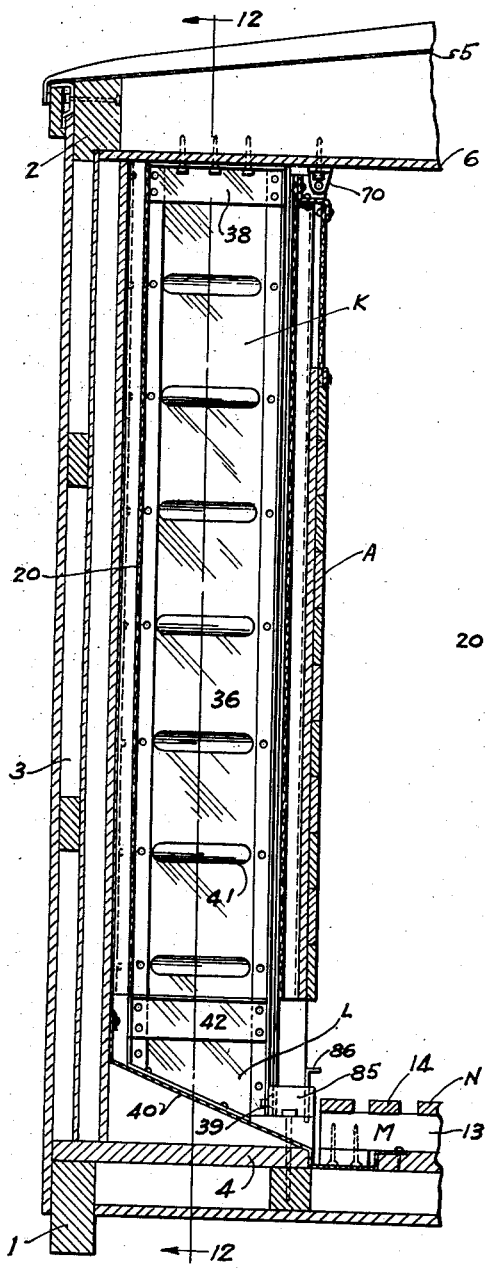
Fig. 11 is a vertical section of the bunker of Figs. 5 and 7 showing the partition and associated parts.
Figure 12:
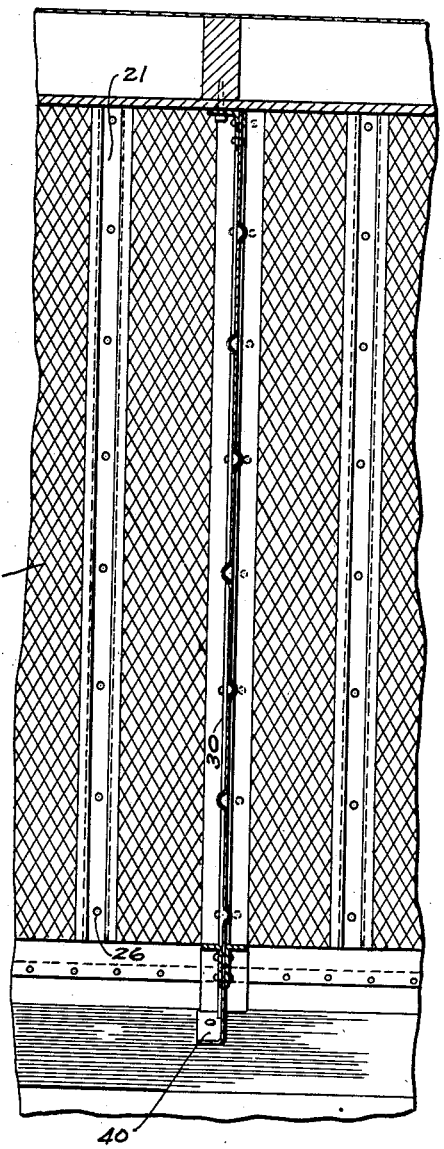
Fig. 12 is a section on line 12—12 of Fig. 11 showing the inner foraminous wall.

Each bunker comprises one or more partitions or baffles 30 extending preferably from the floor of the car (or the floor of the bunker) to the ceiling, as shown in Fig. 11. One vertical edge of the baffle or partition 30 is attached preferably to the side wall 3 of the car by means of the flange 31 and lag screws 26 (Fig. 2), which attaching means also secures the flange 25 of the foraminous wall to the wall of the car. The outer vertical edge of the baffle or partition is similarly secured to the outer or solid wall 32 of the bunker by the bolt 33 when a rigid outer wall is used, which bolt also secures the flange 25 of the foraminous wall to the padding or solid wall 32, as shown in Fig. 2. When a hinged padding or wall 35 is used the partitions 36 are provided with lateral flanges 37 to form stops for a swinging section, as shown in Fig. 8. These flanges 37 form stiffeners or posts and are secured to the ceiling by means of the angle 38 and to the floor by means of the post pocket 39. (Fig. 11.) The body of the baffle or partition is secured to the ceiling by the angle 38 and to the floor by the flange 40. (Fig. 11.) The baffle or partition is preferably formed with integral horizontal corrugations 41 to strengthen and stiffen the sheet against the tendency of the ice or brine tanks to shift or slide longitudinally in the cooling chamber. The angles 42 also form stiffeners against horizontal forces and furthermore may be used to support grate bars E or other ice supporting means. The short lateral bulkhead B is similar to the baffles 30—36, i. e., a metallic plate extending from the floor to the ceiling of the car and secured thereto respectively. The end flue J is provided by securing a foraminous wall 43—44 of expanded metal to the short bunker B, as shown in Figs. 1 and 7. The flue H adjacent the end wall 10 of the car is provided by securing a foraminous wall 45—46 of expanded metal to the end wall 10, as shown in Figs. 1 and 7.

In the modification shown in Fig. 3 the inner flange 50 of the partition 51 is secured to the side wall 3 of the car by lag 52 and the adjacent outwardly projecting flanges 53 of adjacent inner wall sheets 20 are secured together and to the partition by the bolts 54. The adjacent inwardly projecting flanges 56 of adjacent outer wall sheets 57 are secured together and to the partition by the bolts 58. A stiffening flange 59 is provided at the outer margin of the partition 51 which is preferably secured to the floor 4 and ceiling 6 of the car. The nailing strip 60 is attached to the partition by the bolts 61 to which the solid wall or padding 32 is nailed (62). This padding 32 may also be bolted to the foraminous wall 57 by the bolt 63. This partition is shown with corrugations 64 projecting in opposite directions.

Figures 5, 6:
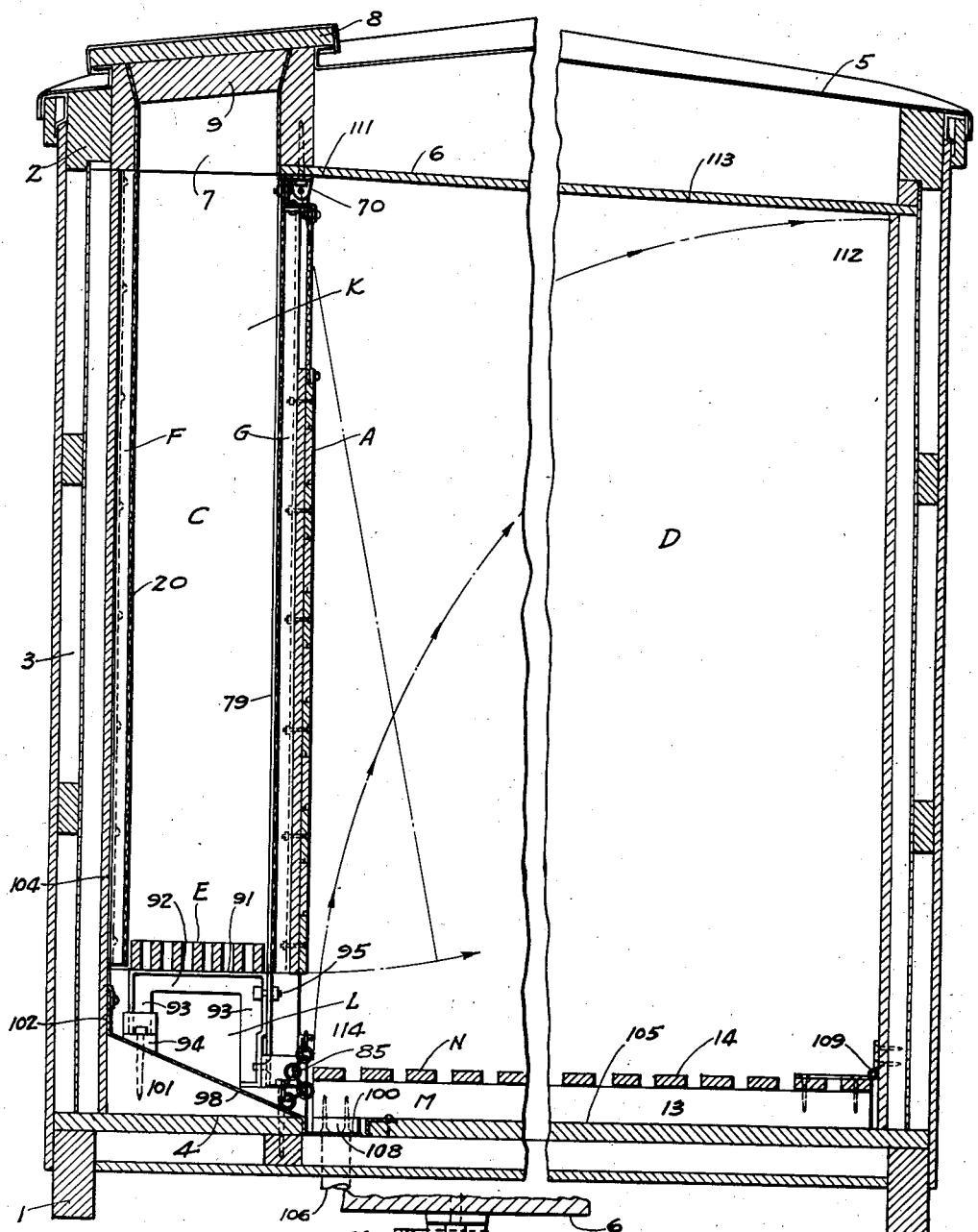
Fig. 5 is a cross section of a railway car showing the bunker comprising a plurality of hinged sections.
Fig. 6 shows the hinge construction in detail.
Figure 13:
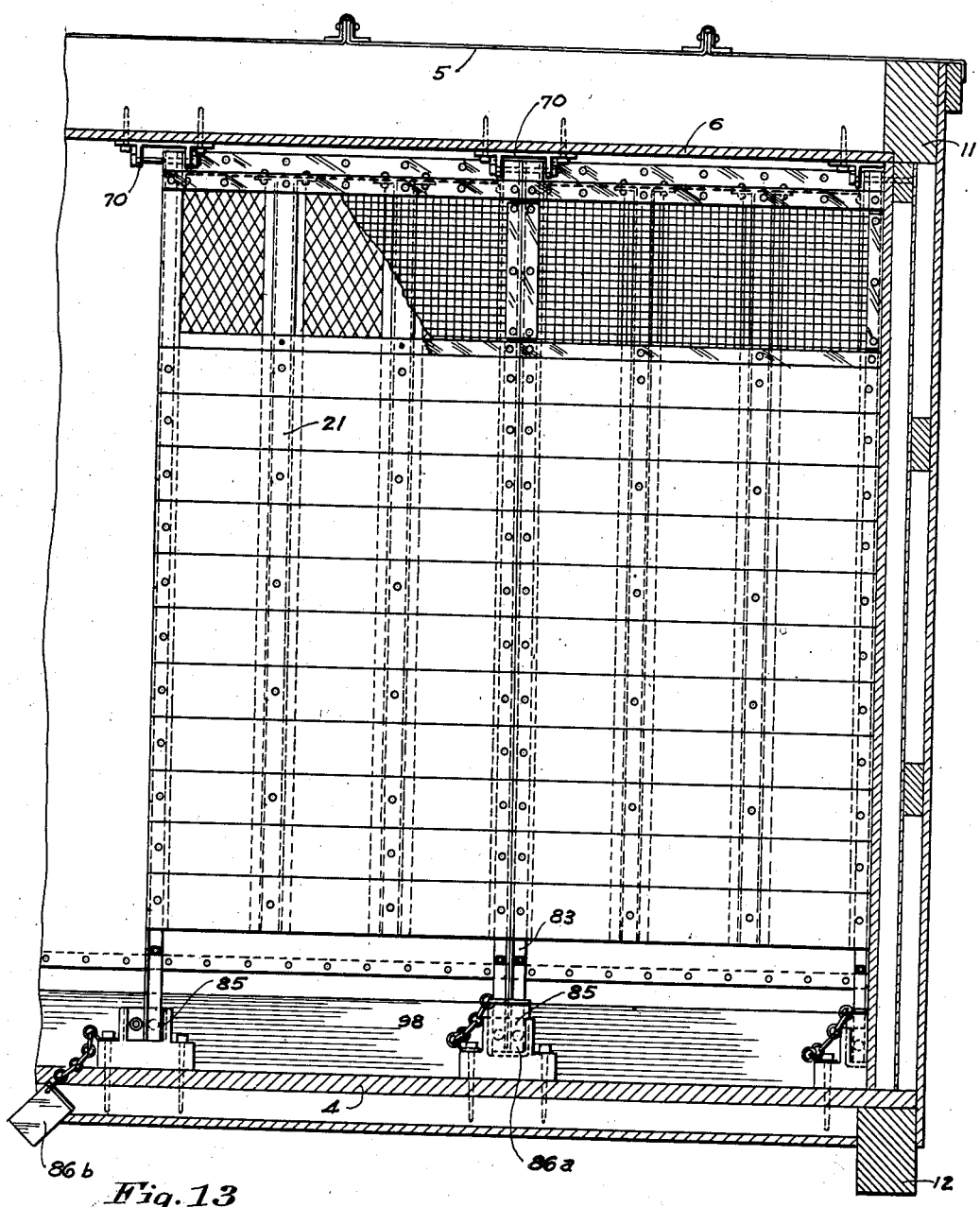
Fig. 13 shows an interior view of the modification of Figs. 5, 7, 11 and 12.

In the modification shown in Figs. 5 to 12 inclusive the outer wall A of the air circulating chamber C (sometimes called the bulkhead) comprises one or more parts or sections hinged to the car adjacent the ceiling to swing away from the air circulating chamber C, as shown in Fig. 5. Part of the outer wall may be rigidly attached to the car, but enough of such wall should comprise hinged parts or sections to provide access to any part of the bunker. The hinge construction comprises a hinge butt 70 secured to the ceiling and pivotally attached to the hinge piece 71 on adjacent doors by a pin 72, as shown in Fig. 6. The hinge construction is designed to resist the tendency of the hinged sections to shift longitudinally of the car due to the stopping or starting of the car. The inertia of each hinged section is independently resisted. The upper edge of the hinged parts is provided with a Z-shaped stiffener 73 having an upwardly projecting flange 74 terminating adjacent the ceiling 6 and a downwardly projecting flange 75 overlapping the netting 76 which protects the upper air circulating opening K. (See Fig. 6.) Each hinged section comprises a solid wall 78 in spaced relation to a foraminous wall 79 to form a flue G therebetween for circulating air. The solid wall, as shown, comprises vertical boards 80 secured to horizontal boards 81 which are nailed to nailing strips 82 secured to the vertical side frame angles 83 of the section. These frame angles 83 form posts when the sections are in closed position and engage the post pockets 85 so as to swing therefrom only in a vertical plane and are held therein (and preferably wedged therein) by a removable means, such as a locking member 86. This member is shown in locking position at 86a and in unlocked position at 86b in Fig. 13. The holes in the upper parts of these frame angles 83 for the pin 72 are slightly elongated vertically to permit them to rest upon the post pockets 85. Fig. 10 shows an angle section 83 used as a frame member, whereas Fig. 9 shows a channel section 88 used for this purpose.

The foraminous wall 79 of the outer wall of the bunker comprises one or more sections of expanded metal of similar construction to the inner foraminous wall heretofore described. (See Fig. 4.) The marginal portions 90 of the wall being attached to the frame angles 83 of the hinged sections (Fig. 10). This foraminous wall 79 extends from the ceiling 6 to adjacent the grate supports, as shown in Fig. 5. The upper parts of the stiffeners 83 of the wall are secured to the Z shaped stiffener 73, as shown in Fig. 6.

The ice supporting means (or supports for an air temperature changing means) comprises a yoke shaped member 91 having an upper horizontal part 92 to support grate bars E, brine tanks, etc., and spaced apart vertical legs 93 engaging pockets 94 preferably secured to the floor of the bunker so as to prevent movement of the member 91 toward the lading compartment D of the car and preferably to prevent movement thereof in a horizontal plane so as to allow movement of such ice supporting means in only a substantially vertical direction.

The lower portion of the bulkhead, that is the angular frame members 83, are positioned in front of the ice supporting means 91 and are secured thereto by the removable bolts 95. In this arrangement the swingable bulkhead prevents the ice supporting means 91 from rising out of the pockets 94 and the ice supporting means 91 prevents the bulkhead from swinging out of normal position so that the bulkhead and the ice supporting means mutually retain each other in normal position. In other words, the bulkhead cannot swing out of normal position until the ice supporting means is raised and the bulkhead prevents the ice supporting means from rising. (See Fig. 5.) Either the locking member 86 or the bolts 95 may be used.

The floor 98 of the air circulating chamber C slopes downwardly toward the lading compartment D so that melted ice, sawdust and debris will run into the drip pan 100 which is located in the lading compartment D, adjacent to and parallel to the bulkhead A and preferably extends the full length of the bulkhead A. The floor itself is preferably a galvanized metallic sheet supported by a plurality of wedge shaped stringers 101. The floor has an upstanding flange 102 secured to the side wall 3 which is overlapped by the galvanized sheet 104 which protects the side wall from moisture. The drip pan 100 is made of a metallic sheet depressed below the floor 105 level of the lading compartment D. One or more drain traps 106 of usual construction may be used. The false floor comprises a plurality of stringers 13 forming transverse air conduits M therebetween communicating with the air circulating chamber C and with the lading compartment D through the openings between the slats 14 attached to the stringers. Some of the stringers have pieces 108 secured to them which practically fill up the drip pan 100 to form baffles to prevent splashing of water. The false floor is hinged to the opposite side walls by the hinges 109 and/or any convenient means may be used to hold it in a vertical position adjacent the side wall of the car.

The ceiling is preferably obliquely positioned with the highest point (111) adjacent the bulkhead A and with the lowest point (112) adjacent the opposite side wall 3. The sloping floor 98 of the cooling compartment C accelerates the movement of the cooled air toward the lading compartment D and the sloping ceiling 113 accelerates the movement of the warmed air in the lading compartment D toward the upper part of the cooling chamber C, thus augmenting the circulation of the air and also tending to eliminate the cold pocket at 114 and the warm pocket at 112.

Figure 14:
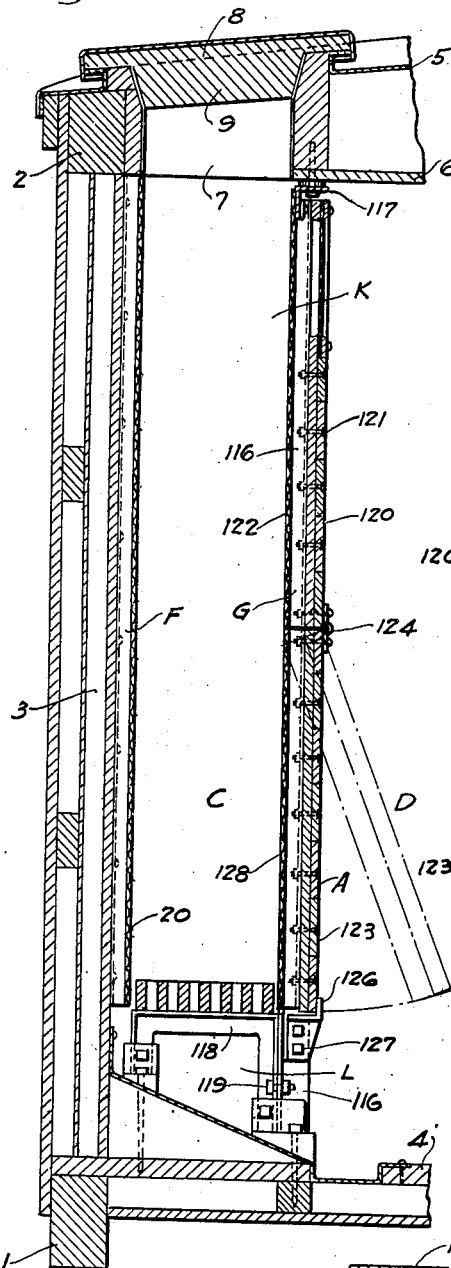
Figs. 14 and 16 show a modified construction wherein the upper part of the bulkhead is rigid and the lower part is hinged to the upper part.
Figure 16:
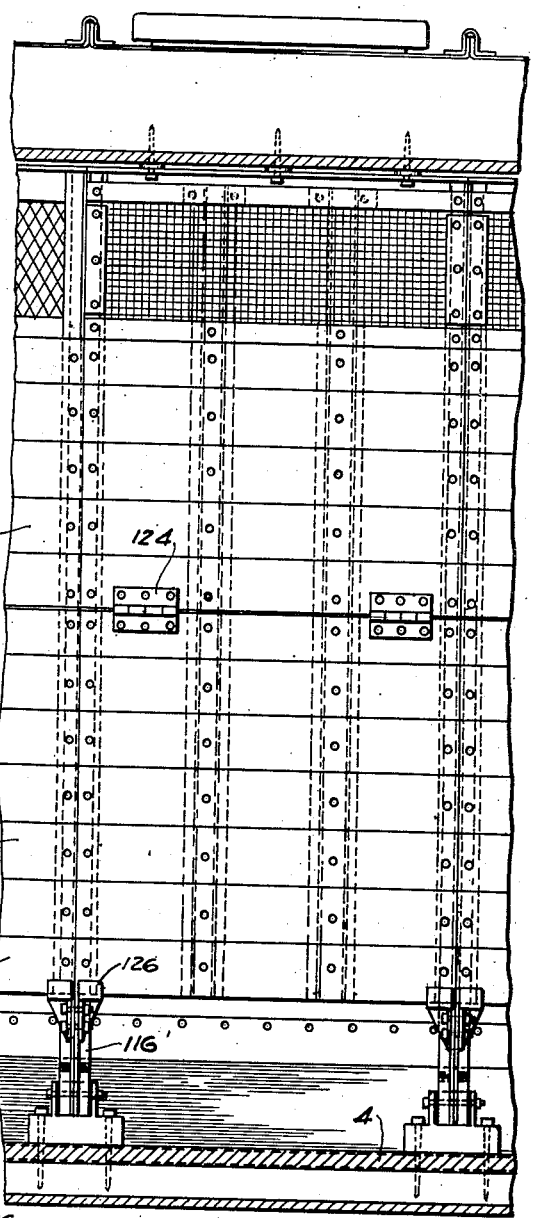
Figure 15:
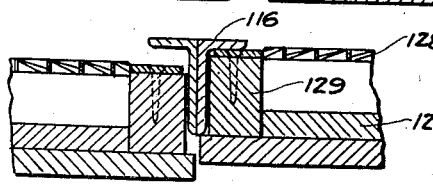
Fig. 15 shows the relation of the hinged lower part to the posts.

Figs. 14, 15 and 16 show a modified construction wherein the bulkhead A comprises a plurality of pairs of metallic angular posts 116 which are secured to the ceiling by means of the angle 117 and to the grate supporting means 118 by the bolts 119. The bottom of these angles may be secured to the floor independently of the grate supporting means 118. The upper part of this bulkhead A comprises a series of boards 120 forming a solid wall secured to the posts 116 by the bolts 121 and also a foraminous wall 122 of expanded metal secured to the angle posts 116. The lower part of this bulkhead A comprises a plurality of doors 123 hinged to the upper section 120 by means of the hinges 124 to swing away from the air circulating chamber C. The lower parts of these doors are held in normal position by the lips on the brackets 126, which brackets are attached to the angle posts by the bolts 127. To open the doors these bolts 127 and brackets 126 are removed. The doors 123 comprise a solid wall of boards and a foraminous wall 128 both secured to the stiles 129 at the vertical margins of the doors. Fig. 15 is an enlarged section showing the relation of the stiles 129, solid wall 123 and foraminous wall 128, of the hinged section to the angular posts 116 with the door on the left out of engagement with the post 116 and with the door on the right in engagement therewith.

Figure 17:
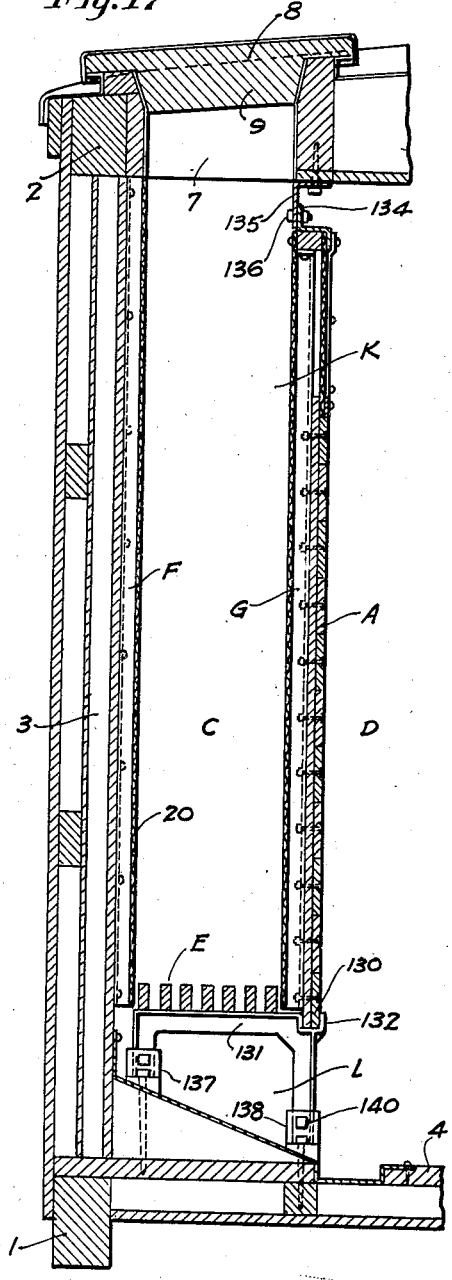
Figs. 17 and 18 show a modified construction wherein the wall of the bulkhead is bodily removable from vertical posts.
Figure 18:
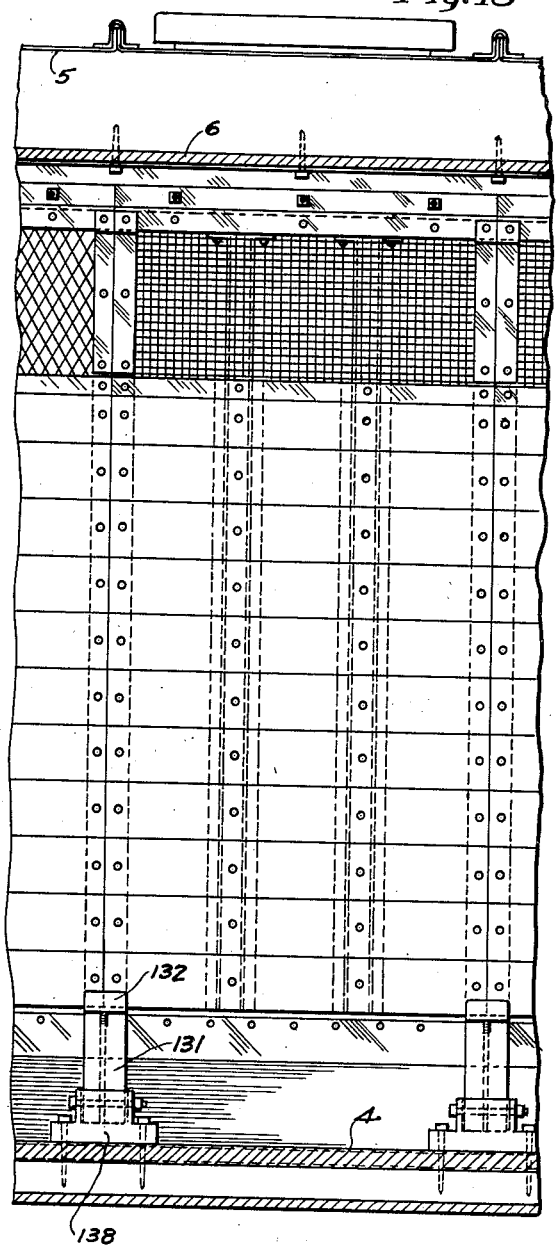

Figs. 17 and 18 show a modified construction wherein the bulkhead A rests in recesses 130 provided in the grate bar supports 131 by a wall and an upstanding flange 132. The upper edge of the bulkhead is provided with an upstanding flange 134 and an angle is secured to the ceiling 6 of the car which is provided with a depending flange 135. The upper part of the bulkhead is secured to the car by the removable bolts 136. The grate supporting means 131 engage pocket castings 137—138 so as to be removed therefrom only in an upward direction so that the grate supporting means cannot be moved out of place until the bulkhead is removed. (Bolts 140 may be provided if desired to hold the grate supporting means in the pocket casting.) To remove the bulkhead A the bolts 136 are removed and the bulkhead is then bodily raised out of the recesses 130.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim:

1. In a railway refrigerating car, a bulkhead forming a cooling chamber separate from the lading compartment, a part of the bulkhead being hinged to swing away from the cooling chamber, pockets in the cooling chamber, ice supporting means in the cooling chamber engaging said pockets so as to prevent movement of said means toward said lading compartment and so as to allow movement of said means in a substantially vertical direction, the lower portion of said part of the bulkhead being positioned in front of said ice supporting means, and removable means to secure the bulkhead to the ice supporting means, whereby the bulkhead prevents the ice supporting means from rising out of the pockets and the ice supporting means prevents the bulkhead from swinging out of normal position.

2. In a railway refrigerator car having walls, a floor and ceiling; a bulkhead adjacent one of the walls and parallel thereto forming a cooling chamber separate from the lading compartment, said bulkhead consisting of a plurality of sections each hinged to the car adjacent the ceiling to swing independently of the other sections, each of said sections comprising spaced apart vertical frame members, an inner foraminous wall and an outer solid wall spaced from the inner wall to form a flue, said foraminous wall made of expanded metal secured to said frame members and a non-expanded vertical central portion bent to form a stiffener backing up the solid wall.

3. In a railway refrigerator car having walls, a floor and ceiling, a bulkhead adjacent one of the walls and parallel thereto forming a cooling chamber separate from the lading compartment, said bulkhead consisting of a plurality of sections each hinged to the car adjacent the ceiling to swing independently of the other sections, each of said sections comprising spaced apart vertical frame members, an inner foraminous wall and an outer solid wall spaced from the inner wall to form a flue, said foraminous wall made of expanded metal with non-expanded vertical marginal portions secured to said frame members and a non-expanded vertical central portion bent to form a stiffener backing up the solid wall.

4. In a railway refrigerator car having spaced apart side walls, a floor and a ceiling; a bulkhead forming a cooling chamber separate from the lading compartment, said bulkhead consisting of a plurality of sections each hinged to the car adjacent the ceiling to swing independently of the other sections, each of said sections comprising spaced apart vertical frame members, an inner foraminous wall and an outer solid wall spaced from the inner wall to form a flue, and means to fasten the frame members of adjacent sections together to provide cooperation therebetween as beams.

5. In a railway refrigerator car, a bulkhead forming a cooling chamber separate from the lading compartment, said bulkhead hinged to swing away from the cooling chamber, pockets in the cooling chamber, ice supporting means having portions engaging said pockets so as to be removed therefrom by movement in substantially a vertical direction only, removable means to attach the ice supporting means to the bulkhead against movement in a vertical direction, whereby the bulkhead and the ice supporting means mutually retain each other in normal position.

6. In a railway refrigerator car, a bulkhead forming a cooling chamber separate from the lading compartment, a part of the bulkhead being hinged to swing away from the cooling chamber, pockets in the cooling chamber, ice supporting means in the cooling chamber engaging said pockets so as to prevent movement of said means toward said lading compartment and so as to allow movement of said means in a substantially vertical direction, the lower portion of said part of the bulkhead resting upon said ice supporting means and removable means to secure the bulkhead to the ice supporting means whereby the bulkhead prevents the ice supporting means from rising out of the pockets and the ice supporting means prevents the bulkhead from swinging out of normal position.

7. In a railway refrigerator car, a bulkhead forming a cooling chamber separate from the lading compartment, a part of the bulkhead being hinged to swing away from the cooling chamber, pockets in the cooling chamber, ice supporting means in the cooling chamber engaging said pockets so as to prevent movement of said means in a substantially horizontal plane and so as to allow movement of said means in a substantially vertical direction and removable means to secure the bulkhead to the ice supporting means whereby the bulkhead cannot be swung out of normal position until the ice supporting means is raised and the bulkhead prevents the ice supporting means from rising.

8. In a railway refrigerator car, a partition formed of a metallic plate extending normal to a wall of the car and secured to said car wall, a solid bulkhead secured to the outer margin of said partition, said bulkhead having openings therein adjacent the upper and lower portons thereof whereby air circulation may be established, an inner foraminous wall of expanded metal in spaced relation to said car wall, said inner foraminous wall having a non-expanded vertical margin bent to form a flange projecting away from said car wall and secured to the partition and an outer foraminous wall of expanded metal in spaced relation to said bulkhead, said outer foraminous wall having a non-expanded vertical margin bent to form a flange projecting away from said bulkhead and secured to the partition.

9. In a railway refrigerator car, a partition formed of a metallic plate extending normal to a wall of the car and secured to said car wall, a solid bulkhead secured to the outer margin of said partition, said bulkhead having openings therein adjacent the upper and lower portions thereof whereby air circulation may be established, an inner foraminous wall of expanded metal in spaced relation to said car wall having non-expanded vertical portions bent to form stiffeners, said inner foraminous wall having a non-expanded vertical margin bent to form a flange projecting away from said car wall and secured to the partition and an outer foraminous wall of expanded metal in spaced relation to said bulkhead having non-expanded vertical portions bent to form stiffeners engaging the bulkhead, said outer foraminous wall having a non-expanded metal vertical margin bent to form a flange projecting away from said bulkhead and secured to the partition.

10. In a railway refrigerator car, a partition formed of a metallic plate extending normal to a wall of the car and secured to said car wall, a solid bulkhead secured to the outer margin of said partition, said bulkhead having openings therein adjacent the upper and lower portions thereof whereby air circulation may be established, an inner foraminous wall of expanded metal in spaced relation to said car wall having non-expanded vertical portions bent to form stiffeners engaging and secured to said car wall, said inner foraminous wall having a non-expanded vertical margin bent to form a flange projecting away from said car wall and secured to the partition and an outer foraminous wall of expanded metal in spaced relation to said bulkhead having non-expanded vertical portions bent to form stiffeners engaging and secured to said bulkhead, said outer foraminous wall having a non-expanded vertical margin bent to form a flange projecting away from said bulkhead and secured to the partition.

11. In a railway refrigerator car, a partition formed of a metallic plate extending normal to a wall of the car, said partition having a flange at one vertical margin secured to said car wall, and a flange at the opposite vertical margin, a solid bulkhead secured to said last mentioned flange, said bulkhead having openings therein adjacent the upper and lower portions thereof whereby air circulation may be established, an inner foraminous wall of expanded metal in spaced relation to said car wall, said inner foraminous wall having a non-expanded vertical margin bent to form a flange projecting away from said car wall and secured to the partition, and an outer foraminous wall of expanded metal in spaced relation to said bulkhead, said outer foraminous wall having a non-expanded vertical margin bent to form a flange projecting away from said bulkhead and secured to the partition, said partition formed with integral corrugations extending between said flanges.

12. In a railway refrigerator car, a partition formed of a metallic plate extending normal to a wall of the car and secured to said car wall, a solid bulkhead secured to the outer margin of said partition, said bulkhead having openings therein adjacent the upper and lower portions thereof whereby air circulation may be established, an inner foraminous wall in spaced relation to said car wall, said inner foraminous wall bent to form a flange projecting away from said car wall and secured to the partition and an outer foraminous wall in spaced relation to said bulkhead, said outer foraminous wall bent to form a flange projecting away from said bulkhead and secured to the partition.

13. In a railway refrigerator car, a partition formed of a metallic plate extending normal to a wall of the car and secured to said car wall, a solid bulkhead secured to the outer margin of said partition, said bulkhead having openings therein adjacent the upper and lower portions thereof whereby air circulation may be established, an inner foraminous wall in spaced relation to said car wall and secured to the partition and an outer foraminous wall in spaced relation to said bulkhead and secured to the partition, said partition formed with integral corrugations to stiffen said portion between said foraminous walls.

GARTH G. GILPIN.